United States Patent
Jung et al.

(10) Patent No.: US 10,650,213 B2
(45) Date of Patent: May 12, 2020

(54) FINGERPRINT SENSING DEVICE AND METHOD FOR DRIVING THE SAME

(71) Applicant: Samsung Display Co., Ltd., Yongin-si, Gyeonggi-do (KR)

(72) Inventors: Keum Dong Jung, Seoul (KR); Ki Seo Kim, Suwon-si (KR); Il Nam Kim, Hwaseong-si (KR); Jae-Kyoung Kim, Hwaseong-si (KR); Kyung Tea Park, Seoul (KR); Jong In Baek, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 187 days.

(21) Appl. No.: 15/890,581

(22) Filed: Feb. 7, 2018

(65) Prior Publication Data
US 2019/0095669 A1   Mar. 28, 2019

(30) Foreign Application Priority Data
Sep. 26, 2017 (KR) .......................... 10-2017-0124371

(51) Int. Cl.
*G06K 9/00* (2006.01)
(52) U.S. Cl.
CPC ......... *G06K 9/0002* (2013.01); *G06K 9/0008* (2013.01); *G06K 9/00067* (2013.01)
(58) Field of Classification Search
None
See application file for complete search history.

(56) References Cited

U.S. PATENT DOCUMENTS

| | | | |
|---|---|---|---|
| 9,268,989 B2 | 2/2016 | Pope et al. | |
| 9,460,332 B1 | 10/2016 | Bussat | |
| 2010/0066878 A1* | 3/2010 | Mabuchi | H01L 27/14654 348/296 |
| 2011/0115733 A1* | 5/2011 | Shih | G06F 3/0412 345/173 |
| 2016/0042216 A1* | 2/2016 | Yang | G06K 9/0002 382/124 |
| 2016/0048717 A1 | 2/2016 | Yang et al. | |
| 2016/0253541 A1* | 9/2016 | Yang | G09G 3/32 382/124 |
| 2017/0006245 A1* | 1/2017 | Akhavan Fomani | G06K 9/0002 |
| 2017/0255806 A1* | 9/2017 | Kang | G06K 9/0002 |

FOREIGN PATENT DOCUMENTS

KR   10-1210473   12/2012

* cited by examiner

*Primary Examiner* — Hadi Akhavannik
(74) *Attorney, Agent, or Firm* — Innovation Counsel LLP (57) ABSTRACT

A fingerprint sensing device includes: a fingerprint sensor including scan lines and initialization lines extending in a first direction and arranged in a second direction, sensing lines extending in the second direction and arranged in the first direction, and sensing pixels connected to the scan lines, the initialization lines, and the sensing lines and disposed in a matrix configuration; a scan driver configured to apply an enable-level initialization signal to a-numbered sensing pixel rows while applying a disable-level initialization signal to b-numbered sensing pixel rows, and applying an enable-level scan signal to one sensing pixel row in the b-numbered sensing pixel rows; and a sensing driver configured to receive a sensing signal from the sensing pixel row to which the scan signal is applied through the sensing lines, wherein the a and b are positive numbers that are greater than 2.

18 Claims, 7 Drawing Sheets

```
┌─────────────────────────────────────────────┐
│  Initialize a-numbered sensing pixel rows   │─── S10
└─────────────────────────────────────────────┘
                     │
                     ▼
┌─────────────────────────────────────────────┐
│ Stop initializing b-numbered sensing pixel rows │─── S20
└─────────────────────────────────────────────┘
                     │
                     ▼
┌─────────────────────────────────────────────┐
│   Sense fingerprint of one sensing pixel row │─── S30
└─────────────────────────────────────────────┘
```

FINGERPRINT SENSING DEVICE AND METHOD FOR DRIVING THE SAME

CROSS-REFERENCE TO RELATED APPLICATION

This application claims priority to and the benefit of Korean Patent Application No. 10-2017-0124371 filed in the Korean Intellectual Property Office on Sep. 26, 2017, the entire contents of which are incorporated herein by reference.

BACKGROUND

(a) Field

The present disclosure relates to a fingerprint sensing device and a driving method thereof.

(b) Description of the Related Art

As various terminals and wearable devices have recently been developed, various functions utilizing personal information such as finance or security are provided, and the importance of security verification is increasing.

Biometrics authentication verifies a user by using fingerprints, irises, voice, face, or blood vessels. The biometric characteristics used for verification are unique for individuals in the relevant population such that they can be distinguished from one another. By using the biometrics authentication method, inconvenience in possession and risk of illegal uses or imitation may be prevented. The biometric characteristics are not easily changed for life.

Particularly, the fingerprint verifying method is gradually becoming commercially available because of many reasons such as convenience, security, and economic feasibility. A fingerprint sensor used by the fingerprint verifying method directly or indirectly contacts the finger of the user to recognize a fingerprint image of the finger and capture a fingerprint pattern from the fingerprint image.

The above information disclosed in this Background section is only for enhancement of understanding of the background and therefore it may contain information that does not form the prior art that is already known in this country to a person of ordinary skill in the art.

SUMMARY

The present inventive concept has been made in an effort to provide a fingerprint sensing device for reducing blur of a fingerprint image, and a driving method thereof.

The present inventive concept has been made in an effort to provide a fingerprint sensing device for blocking external noise, and a driving method thereof.

An exemplary embodiment of the present inventive concept provides a fingerprint sensing device including: a fingerprint sensor including a plurality of scan lines and a plurality of initialization lines extending in a first direction and arranged in a second direction, a plurality of sensing lines extending in the second direction and arranged in the first direction, and a plurality of sensing pixels connected to the scan lines, the initialization lines, and the sensing lines and disposed in a matrix configuration; a scan driver configured to apply an enable-level initialization signal to a-numbered sensing pixel rows while applying a disable-level initialization signal to b-numbered sensing pixel rows, and applying an enable-level scan signal to one sensing pixel row in the b-numbered sensing pixel rows; and a sensing driver configured to receive a sensing signal from the sensing pixel row to which the scan signal is applied through the sensing lines, wherein the a and b are positive numbers that are greater than 2.

The sensing pixels may respectively include: a reference capacitor including one electrode connected to a first node and another electrode connected to a corresponding initialization line from among the plurality of initialization lines; a touch capacitor including one electrode connected to the first node; a first transistor configured to output a sensing signal to a corresponding sensing line from among the sensing lines according to a voltage at the first node; a second transistor connected to a corresponding scan line from among the scan lines and configured to transmit the sensing signal to the sensing line; and a third transistor connected to the initialization line and initializing the first node.

The fingerprint sensor may further include an initialization voltage line configured to transmit an initialization voltage, and a power supply voltage line configured to transmit a power supply voltage with a higher level than that of the initialization voltage.

The first transistor may include a control electrode connected to the first node, a first electrode connected to the power supply voltage line, and a second electrode connected to the second transistor.

The second transistor may include a control electrode connected to the scan line, a first electrode connected to the second electrode of the first transistor, and a second electrode connected to the sensing line.

The third transistor may include a control electrode connected to the initialization line, a first electrode connected to the initialization voltage line, and a second electrode connected to the first node.

When the b is an odd number, the scan driver may apply the enable-level scan signal to the one sensing pixel row provided in a middle of the b-numbered sensing pixel rows.

The a-numbered sensing pixel rows may include sensing pixel rows provided adjacent to the b-numbered sensing pixel rows.

The a-numbered sensing pixel rows may include sensing pixel rows excluding the b-numbered sensing pixel rows.

The scan driver may apply an enable-level scan signal to the one sensing pixel row, and may apply an enable-level initialization signal to the a-numbered sensing pixel rows.

Another embodiment of the present inventive concept provides a method for driving a fingerprint sensing device including a fingerprint sensor including a plurality of scan lines and a plurality of initialization lines extending in a first direction and arranged in a second direction, a plurality of sensing lines extending in the second direction and arranged in the first direction, and a plurality of sensing pixels connected to the scan lines, the initialization lines, and the sensing lines and disposed in a matrix configuration, including: applying a disable-level initialization signal to b-numbered sensing pixel rows, and applying an enable-level initialization signal to a-numbered sensing pixel rows; while applying the initialization signal, applying an enable-level scan signal to one sensing pixel row in the b-numbered sensing pixel rows; and receiving a sensing signal from the sensing pixel row to which the scan signal is applied through the sensing lines, wherein the a and b are positive numbers that are greater than 2.

The method may further include, after receiving the sensing signal, applying an enable-level initialization signal to the a-numbered sensing pixel row.

The sensing pixels may respectively include: a reference capacitor including one electrode connected to a first node and another electrode connected to a corresponding initialization line from among the plurality of initialization lines; a touch capacitor including one electrode connected to the first node; a first transistor configured to output a sensing signal to a corresponding sensing line from among the sensing lines according to a voltage at the first node; a second transistor connected to a corresponding scan line from among the scan lines and configured to transmit the sensing signal to the sensing line; and a third transistor connected to the initialization line and configured to initialize the first node.

The fingerprint sensor may further include an initialization voltage line configured to transmit an initialization voltage, and a power supply voltage line configured to transmit a power supply voltage with a higher level than that of the initialization voltage.

The first transistor may include a control electrode connected to the first node, a first electrode connected to the power supply voltage line, and a second electrode connected to the second transistor.

The second transistor may include a control electrode connected to the scan line, a first electrode connected to the second electrode of the first transistor, and a second electrode connected to the sensing line.

The third transistor may include a control electrode connected to the initialization line, a first electrode connected to the initialization voltage line, and a second electrode connected to the first node.

The applying of an enable-level scan signal to one sensing pixel row in the b-numbered sensing pixel rows may include, when the b is an odd number, applying the enable-level scan signal to one sensing pixel row provided in a middle of the b-numbered sensing pixel rows.

The a-numbered sensing pixel rows may include sensing pixel rows provided near the b-numbered sensing pixel rows.

The a-numbered sensing pixel rows may include sensing pixel rows excluding the b-numbered sensing pixel rows.

According to the exemplary embodiments, accurate fingerprint patterns may be acquired.

DETAILED DESCRIPTION OF THE EMBODIMENTS

The present inventive concept will be described more fully hereinafter with reference to the accompanying drawings, in which exemplary embodiments are shown. As those skilled in the art would realize, the described embodiments may be modified in various different ways, all without departing from the spirit or scope of the present inventive concept.

Accordingly, the drawings and description are to be regarded as illustrative in nature and not restrictive, and like reference numerals designate like elements throughout the specification.

Unless explicitly described to the contrary, the word "comprise" and variations such as "comprises" or "comprising" will be understood to imply the inclusion of stated elements but not the exclusion of any other elements.

Figure 1:
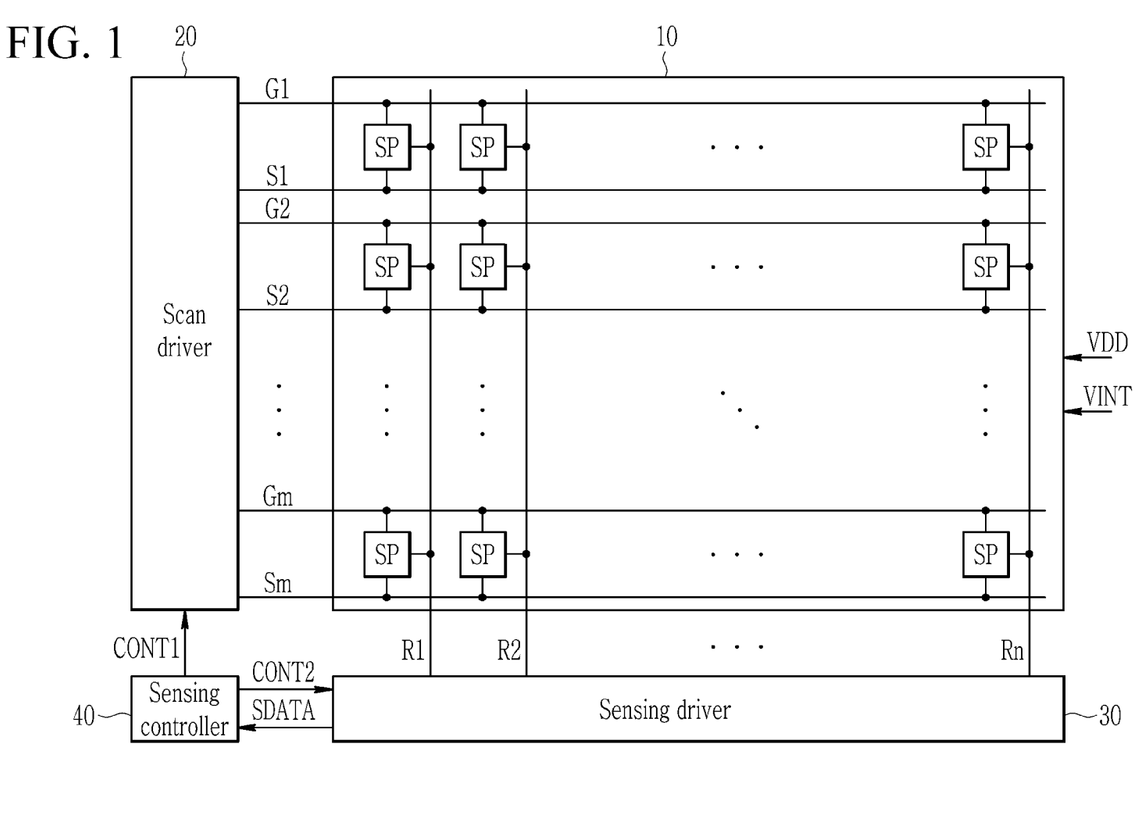
FIG. 1 shows a block diagram of a fingerprint sensing device according to exemplary embodiments.

FIG. 1 shows a block diagram of a fingerprint sensing device according to exemplary embodiments.

Referring to FIG. 1, the fingerprint sensing device includes a fingerprint sensor 10, a scan driver 20, a sensing driver 30, and a sensing controller 40.

The fingerprint sensor 10 includes initialization lines (G1-Gm), scan lines (S1-Sm), sensing lines (R1-Rn), and sensing pixels (SPs) connected to the initialization lines (G1-Gm), the scan lines (S1-Sm), and the sensing lines (R1-Rn) and substantially arranged in a matrix configuration. Although not shown in FIG. 1, the fingerprint sensor 10 further includes a power supply voltage line for transmitting a power supply voltage (VDD) and an initialization voltage line for transmitting an initialization voltage (VINT), and the sensing pixels (SPs) may be connected to the power supply voltage line and the initialization voltage line. In the present disclosure, the initialization voltage will be assumed to have a voltage value that is lower than the power supply voltage.

The initialization lines (G1-Gm) and the scan lines (S1-Sm) may mainly extend in a first direction (e.g., a row direction), and the sensing lines (R1-Rn) may extend in a second direction (e.g., a column direction) crossing the first direction.

Each of the sensing pixels (SP) may generate a sensing signal caused by a touch according to a self-capacitance method. For example, a capacitor (not shown) of the sensing pixel (SP) is charged with a predetermined amount of charges depending on a touching state by a foreign object such as a finger, and while a scan signal is applied to the sensing pixel (SP), a current corresponding to the amount of charges is output as a sensing signal to the sensing lines (R1-Rn).

That is, the amount of charges stored in a capacitor in the sensing pixel (SP) varies according to a distance between one electrode (not shown) of the touch capacitor and the foreign object, and a sensing signal (output signal) caused by it is transmitted to the sensing driver 30 through the sensing lines (R1-Rn).

The sensing controller 40 controls the scan driver 20 and the sensing driver 30. The sensing controller 40 generates a scan control signal CONT1 and a sensing control signal CONT2, and transmits them to the scan driver 20 and the sensing driver 30, respectively.

The scan driver 20 generates an initialization signal including an enable level voltage and a disable level voltage, and applies them to the initialization lines (G1-Gm) in response to the scan control signal CONT1 provided by the sensing controller 40.

Further, the scan driver 20 generates a scan signal including an enable level voltage and a disable level voltage, and applies them to the scan lines (S1-Sm) in response to the scan control signal CONT1 provided by the sensing controller 40.

The scan driver 20 in an exemplary embodiment generates the scan signal and the initialization signal. The fingerprint sensing device may further include an initialization driver for generating an initialization signal, and in this instance, the scan driver 20 may not generate the initialization signal, but it is not limited to the above description.

The sensing driver 30 may be connected to the sensing lines (R1-Rn). The sensing driver 30 receives sensing signals from the sensing pixels (SPs) through the sensing lines (R1-Rn). The sensing driver 30 may receive a sensing control signal CONT2 from the sensing controller 40 to selectively receive a sensing signal from at least one of the sensing lines (R1-Rn).

The sensing driver 30 may generate sensing data (SDATA) in response to the sensing signal. To generate the sensing data (SDATA), the sensing driver 30 may exemplarily include a subtractor, an integrator, and an analog-digital converter (ADC). The sensing data (SDATA) may include fingerprint image information according to the sensing signal from the sensing pixel (SP) to which a driving signal is input. The sensing data (SDATA) may be transmitted to the sensing controller 40 or an external application processor (not shown).

A sensing pixel (SP) included in the fingerprint sensor 10 will now be described with reference to FIG. 2.

Figure 2:
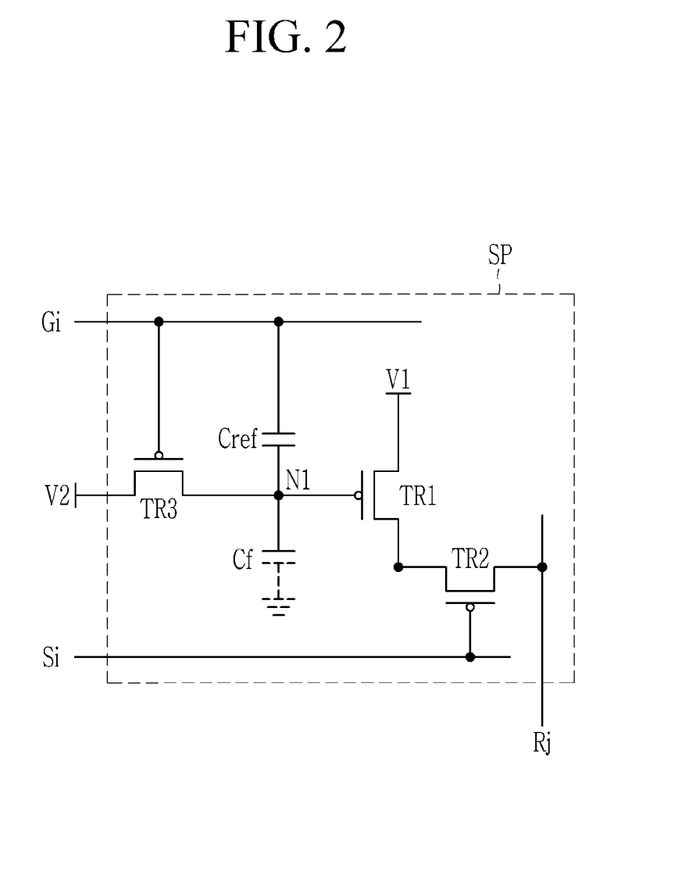
FIG. 2 shows a sensing pixel of a fingerprint sensing device of FIG. 1.

FIG. 2 shows a sensing pixel (SP) of a fingerprint sensing device of FIG. 1. Referring to FIG. 2, the sensing pixel (SP) may be connected to a corresponding initialization line (Gi), a corresponding scan line (Si), a corresponding sensing line (Rj), a power supply voltage line V1, and an initialization voltage line V2.

The sensing pixel (SP) includes a reference capacitor (Cref) connected between a first node N1 and the initialization line (Gi), a first transistor TR1 for outputting a current to the sensing line (Rj) according to a voltage at the first node N1, a second transistor TR2 for transmitting a current provided by the first transistor TR1 to the sensing line (Rj), a third transistor TR3 for initializing the first node N1 according to an initialization signal, and a touch capacitor Cf coupled in parallel to the reference capacitor (Cref) at the first node N1. Capacitance of the touch capacitor Cf changes by a touch.

The reference capacitor (Cref) includes a first electrode connected to the first node N1 and a second electrode connected to the initialization line (Gi).

The first transistor TR1 includes a first electrode connected to a power supply voltage line V1, a second electrode connected to a first end of the second transistor TR2, and a control electrode connected to the first node N1.

The second transistor TR2 includes a first electrode connected to the second electrode of the first transistor TR1, a second electrode connected to the sensing line (Rj), and a control electrode connected to the scan line (Si).

The third transistor TR3 includes a first electrode connected to an initialization voltage line V2, a second electrode connected to the first node N1, and a control electrode connected to the initialization line (Gi).

The touch capacitor Cf includes one electrode connected to the first node N1, and changes the voltage at the first node N1 according to a user's touch.

A method for driving the above-described fingerprint sensing device will now be described with reference to FIG. 3 and FIG. 4.

Figure 3:
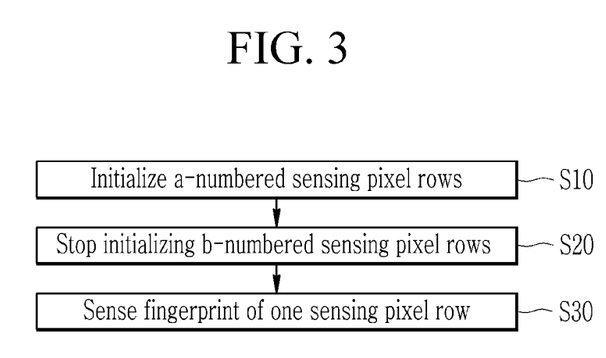
FIG. 3 shows a flowchart of a method for driving a fingerprint sensing device according to exemplary embodiments.
Figure 4:
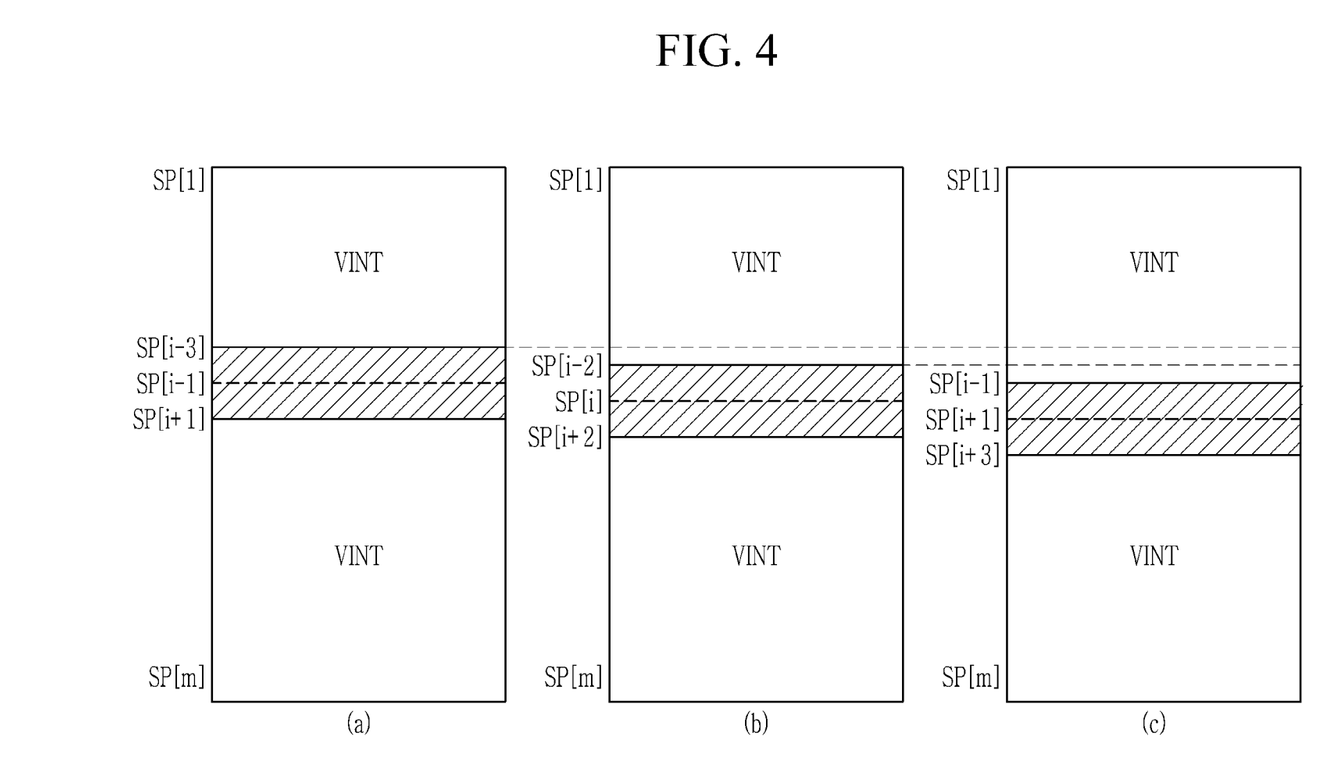
FIG. 4 shows a method for driving a fingerprint sensing device according to an exemplary embodiment.

FIG. 3 shows a flowchart of a method for driving a fingerprint sensing device according to exemplary embodiments, and FIG. 4 shows a method for driving a fingerprint sensing device according to an exemplary embodiment.

As shown in FIG. 3, the scan driver 20 initializes a-numbered (a is a positive number that is greater than 2) sensing pixel rows from among sensing pixels disposed in an m-rows and n-columns in the fingerprint sensor 10 (S10).

For example, referring to FIG. 4 (a), the scan driver 20 applies an enable-level initialization signal to the initialization lines of the sensing pixel rows, the first sensing pixel row (SP[1]) to the m-th sensing pixel row (SP[m]). That is, the first node N1 of sensing pixels included in the sensing pixel rows of the first to m-th rows may be initialized to be the initialization voltage (VINT).

The scan driver 20 stops the initialization of the b-numbered (b is a positive number that is greater than 2) sensing pixel rows from among the sensing pixels disposed in an m-rows and n-columns in the fingerprint sensor 10 (S20).

For example, referring to FIG. 4 (a), the scan driver 20 applies a disable-level initialization signal to the initialization lines of the (i−3)-th sensing pixel row (SP[i−3]) to the (i+1)-th sensing pixel row (SP[i+1]). The voltage at the first node N1 of the sensing pixels included in the (i−3)-th sensing pixel row (SP[i−3]) to the (i+1)-th sensing pixel row (SP[i+1]) increases to a predetermined voltage by the coupling of the reference capacitor (Cref).

The sensing driver 30 receives a sensing signal from one sensing pixel row included in the b-numbered sensing pixel rows (S30).

For example, referring to FIG. 4 (a), the scan driver 20 applies an enable-level scan signal to the scan line in the (i−1)-th sensing pixel row (SP[i−1]) from among the (i−3)-th sensing pixel row (SP[i−3]) to the (i+1)-th sensing pixel row (SP[i+1]). The second transistor TR2 included in the (i−1)-th sensing pixel row (SP[i−1]) is turned on, and the sensing signal is transmitted to the corresponding sensing lines (R1-Rn). The sensing driver 30 may receive the sensing signal transmitted through the sensing lines (R1-Rn).

In this instance, b may be an odd number. The sensing pixel row to which the scan driver 20 applies a scan signal may be a sensing pixel row (SP[i−1]) provided in the middle of the sensing pixel rows (SP[i−3]−SP[i+1]) which receive disable-level initialization signals.

In addition, b may be an even number, and the sensing pixel row to which the scan driver 20 applies a scan signal may be one sensing pixel row substantially provided in the middle of the sensing pixel rows which receive disable-level initialization signals.

After receiving the sensing signal from the (i−1)-th sensing pixel row (SP[i−1]), as shown in FIG. 4 (b), the fingerprint sensing device repeat the stages (S10-S30) so as to receive the sensing signal from the i-th sensing pixel row (MN).

It has been described that the summation of a and b is m, but the number of sensing pixel rows initialized in the stage S10 is not limited to the above-provided description. For example, the scan driver 20 may initialize a predetermined number of sensing pixel rows provided on an upper side and a lower side of the b-numbered pixel rows while stopping the initialization of the b-numbered sensing pixel rows provided in the center of the fingerprint sensor 10. In another way, the scan driver 20 may initialize a predetermined number of sensing pixel rows provided on the lower side of the b-numbered pixel rows while stopping the initialization of the b-numbered sensing pixel rows provided on an upper portion of the fingerprint sensor 10. In another way, the scan driver 20 may initialize a predetermined number of sensing pixel rows provided on the upper side of the b-numbered pixel rows while stopping the initialization of the b-numbered sensing pixel rows provided on a lower portion of the fingerprint sensor 10. In this instance, the predetermined number of sensing pixel rows may be at least one sensing pixel row, and the number of the sensing pixel rows initialized by the scan driver 20 may be less than the number of the sensing pixel rows that stop the initialization.

As shown in FIG. 3, the scan driver 20 initializes the a-numbered (a is a positive number that is greater than 2) sensing pixel rows from among the sensing pixels disposed in an m-rows and n-columns in the fingerprint sensor 10 (S10).

Referring to FIG. 4 (b), in the stage S10, the scan driver 20 applies an enable-level initialization signal to the initialization line of the sensing pixel rows, the first sensing pixel row (SP[1]) to the m-th sensing pixel row (SP[m]). That is, the first node N1 of the sensing pixels included in the sensing pixel rows of the first to the m-th rows may be set to have the initialization voltage (VINT).

In the stage S20, the scan driver 20 applies a disable-level initialization signal to the initialization line of the (i−2)-th sensing pixel row (SP[i−2]) to the (i+2)-th sensing pixel row (SP[i+2]). The voltage at the first node N1 of the sensing pixels included in the (i−2)-th sensing pixel row (SP[i−2]) to the (i+2)-th sensing pixel row (SP[i+2]) is boosted to a predetermined voltage by coupling of the reference capacitor (Cref).

In the stage S30, the scan driver 20 applies an enable-level scan signal to the scan line of the i-th sensing pixel row (SP[i]) from among the (i−2)-th sensing pixel row (SP[i−2]) to the (i+2)-th sensing pixel row (SP[i+2]). The second transistor TR2 included in the i-th sensing pixel row (SP[i]) is turned on, and the sensing signal is transmitted to the corresponding sensing lines (R1-Rn). The sensing driver 30 may receive the sensing signal transmitted through the sensing lines (R1-Rn).

In a like manner, after receiving the sensing signal from the i-th sensing pixel row (SP[i]), as shown in FIG. 4 (c), the fingerprint sensing device repeats the stages S10-S30 so as to receive the sensing signal from the (i+1)-th sensing pixel row (SP[i+1]), which will not be described.

A driving method according to an exemplary embodiment will now be described with reference to FIG. 5

Figure 5:
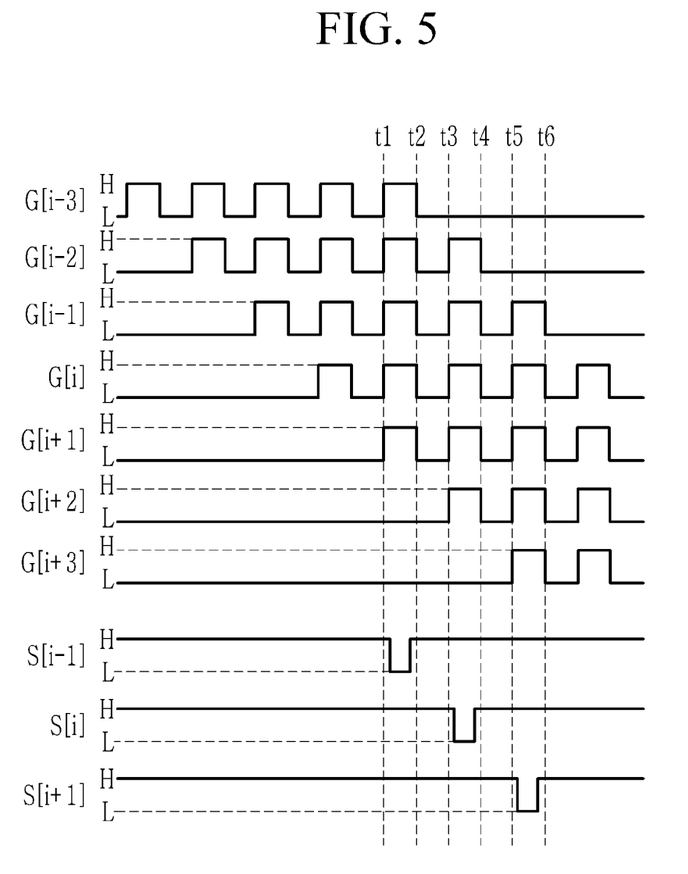
FIG. 5 shows a timing diagram of signals applied to sensing pixels according to a driving method of FIG. 4.

FIG. 5 shows a timing diagram of signals applied to sensing pixels according to a driving method of FIG. 4.

Before a period of t1-t2, the scan driver 20 applies an enable-level (L) initialization signal to the initialization line of the first sensing pixel row (SP[1]) to the m-th sensing pixel row (SP[m]).

For a period of t1-t2, the scan driver 20 applies a disable-level (H) initialization signal (G[i−3:i+1]) to the initialization line of the (i−3)-th sensing pixel row (SP[i−3]) to the (i+1)-th sensing pixel row (SP[i+1]).

The third transistor TR3 of the sensing pixels included in the (i−3)-th sensing pixel row (SP[i−3]) to the (i+1)-th sensing pixel row (SP[i+1]) is turned off, and the voltage at the first node N1 increases to a predetermined voltage by coupling of the reference capacitor (Cref).

In this instance, when there is a touch to the sensing pixels included in the (i−3)-th sensing pixel row (SP[i−3]) to the (i+1)-th sensing pixel row (SP[i+1]), the voltage may be divided to the touch capacitor Cf coupled in parallel to the reference capacitor (Cref). Therefore, the voltage at the first node N1 when there is a touch is lower than the voltage at the first node N1 when there is no touch.

A fingerprint of a user includes ridges and valleys. A distance between one electrode of the touch capacitor Cf and a valley when the valley is touched is longer than a distance between one electrode of the touch capacitor Cf and a ridge when the ridge is touched. Therefore, capacitance of the touch capacitor Cf may become less when the valley is touched than that when the ridge is touched.

To summarize, the voltage at the first node N1 when a disable-level (H) initialization signal (G[i−3:i+1]) is applied to a first end of the reference capacitor (Cref) may gradually have smaller values in order when there is no touch, when the valley is touched, and when the ridge is touched.

While applying a disable-level (H) initialization signal (G[i−3:i+1]) within the period of t1-t2, the scan driver 20 applies an enable-level (L) scan signal (G[i−1]) to the scan line of the (i−1)-th sensing pixel row (SP[i−1]).

The second transistor TR2 of the sensing pixels of the (i−1)-th sensing pixel row (SP[i−1]) is turned on by the enable-level (L) scan signal (S[i−1]). A sensing current may flow through the first transistor TR1 by the voltage at the control end (i.e., the first node N1) of the first transistor TR1 and the power supply voltage (VDD) applied to the first end. The sensing current may gradually have greater values in order when the ridge is touched, when the valley is touched, and when there is no touch. The sensing current may be transmitted as a sensing signal to the respective sensing lines (R1-Rn) through the second transistor TR2.

Conventionally, the touch capacitor Cf included in the sensing pixel row (SP[i−1]) forms an electric field with the finger, thereby generating a fringe effect. The fringe effect gives an influence to the sensing current value, so the fingerprint image causes a blur effect.

Regarding the driving method according to an exemplary embodiment, a disable-level (H) initialization signal is applied to the sensing pixel row (SP[i−1]) for detecting a sensing signal and the sensing pixel rows (SP[i−3], SP[i−2], SP[i], and SP[i+1]) provided adjacent to the sensing pixel row (SP[i−1]), so a predetermined level of voltage is applied to the node N1 connected to one electrode of the touch capacitor Cf. When the touch capacitor Cf included in the sensing pixel row (SP[i−1]) for detecting a sensing signal forms an electric field with the finger, the touch capacitor included in the sensing pixel rows (SP[i−3], SP[i−2], and SP[i], SP[i+1]) provided adjacent to the sensing pixel row (SP[i−1]) also forms an electric field with the finger. That is, the voltage is applied to one electrode of the touch capacitor Cf of the sensing pixel rows (SP[i−3], SP[i−2], SP[i], and SP[i+1]) provided in the second direction, so the fringe effect may be attenuated.

Further, in the period of t1-t2, the scan driver 20 applies an enable-level (L) initialization signal to the initialization line of the sensing pixel rows of the first row to the (i−4)-th row and the (i+2)-th row to the m-th row. The initialization voltage (VINT) is applied to one electrode (the first node N1) of the touch capacitor Cf of the sensing pixels included in the sensing pixel rows of the first row to the (i−4)-th row and the (i+2)-th row to the m-th row.

Therefore, the one electrode of the touch capacitor Cf of the sensing pixel rows is not in a float state but is fixed with a predetermined voltage level, for example, the initialization voltage (VINT), thereby reducing noise generated by the user's body.

For a period of t2-t3, an enable-level (L) initialization signal is applied to all initialization lines (G1-Gm) to initialize the first node N1 of all sensing pixels (SPs) with the initialization voltage (VINT).

For a period of t3-t4, the scan driver 20 applies a disable-level (H) initialization signal (G[i−2:i+2]) to the initialization line of the (i−2)-th sensing pixel row (SP[i−2]) to the (i+2)-th sensing pixel row (SP[i+2]). The third transistor TR3 of the sensing pixels included in the (i−2)-th sensing pixel row (SP[i−2]) to the (i+2)-th sensing pixel row (SP[i+2]) is turned off, and the voltage at the first node N1 increases to a predetermined voltage by coupling of the reference capacitor (Cref).

While applying a disable-level (H) initialization signal (G[i−2:i+2]) within the period of t3-t4, the scan driver 20 applies an enable-level (L) scan signal (Slip to the scan line of the i-th sensing pixel row (SP[i]). The second transistor TR2 of the sensing pixels of the i-th sensing pixel row (SP[i]) is turned on by the enable-level (L) scan signal (Slip. A sensing current may flow through the first transistor TR1 by the voltage at the control end (the first node N1) of the first transistor TR1 and the power supply voltage (VDD) applied to the first end. The sensing current may gradually have greater values in order when the ridge is touched, when the valley is touched, and when there is no touch. The sensing current may be transmitted as a sensing signal to the respective sensing lines (R1-Rn) through the second transistor TR2.

Further, in the period of t3-t4, the scan driver 20 applies an enable-level (L) initialization signal to the initialization line of the sensing pixel rows of the first row to the (i−3)-th row and the (i+3)-th row to the m-th row.

For a period of t4-t5, an enable-level (L) initialization signal is applied to all initialization lines (G1-Gm) to initialize the first node N1 of all sensing pixels (SPs) with the initialization voltage (VINT).

Through the above-described driving method, the fingerprint sensing device according to an exemplary embodiment and the method for driving the fingerprint sensing device may decrease external noise and may improve the blurring effect of the fingerprint image to thus acquire the accurate fingerprint pattern.

A method for driving a fingerprint sensing device according to another exemplary embodiment will now be described with reference to FIG. 6 and FIG. 7.

Figure 6:
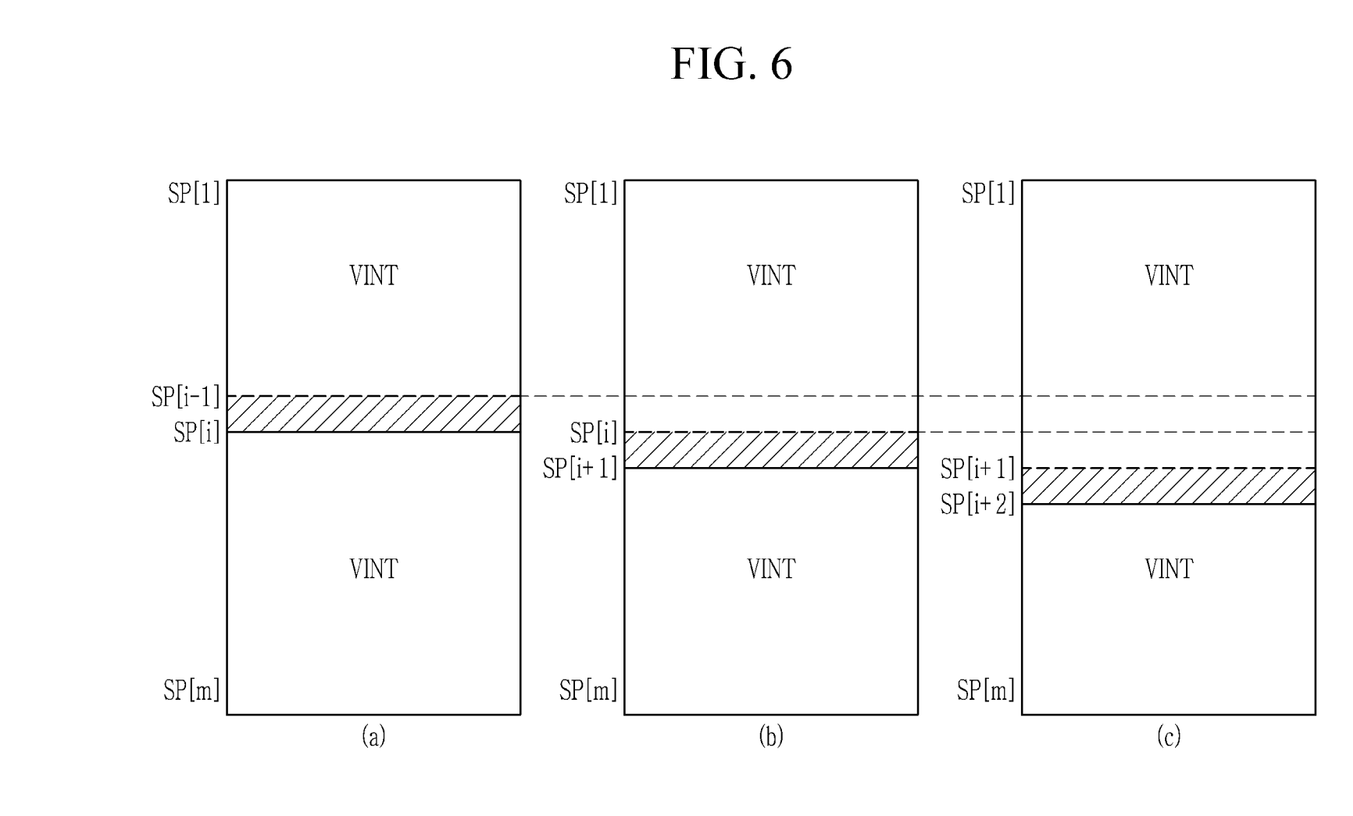
FIG. 6 shows a method for driving a fingerprint sensing device according to another exemplary embodiment.
Figure 7:
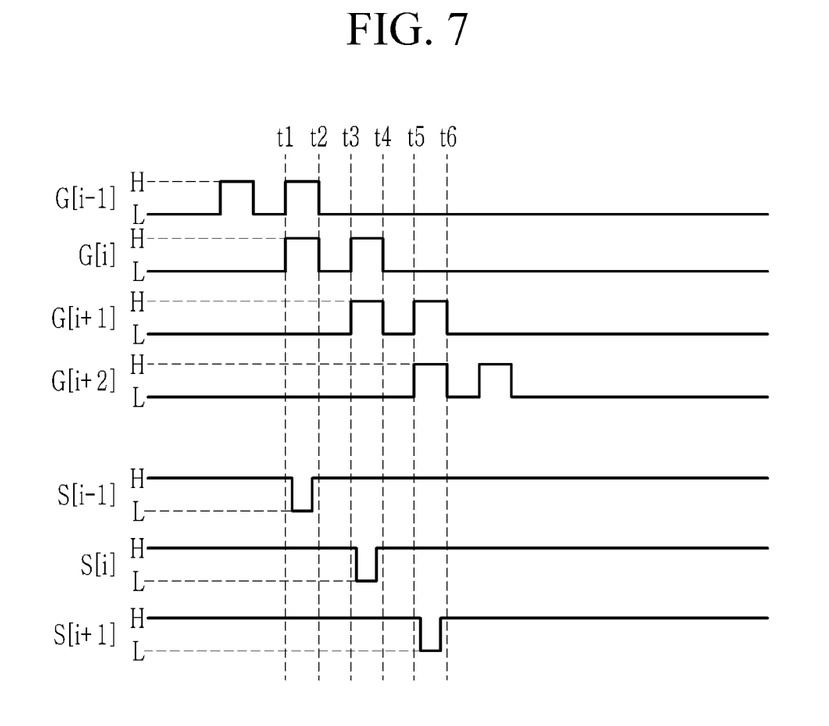
FIG. 7 shows a timing diagram of signals applied to sensing pixels according to a driving method of FIG. 6.

FIG. 6 shows a method for driving a fingerprint sensing device according to another exemplary embodiment, and FIG. 7 shows a timing diagram of signals applied to sensing pixels according to a driving method of FIG. 6.

Referring to FIG. 3 and FIG. 6 (a), in the stage S10, the scan driver 20 applies an enable-level initialization signal to the initialization line of the sensing pixel rows, the first sensing pixel row (SP[1]) to the m-th sensing pixel row (SP[m]). That is, the first node N1 of sensing pixels included in the sensing pixel rows of the first to the m-th rows, may be initialized to be the initialization voltage (VINT).

In the stage S20, the scan driver 20 applies a disable-level initialization signal to the initialization line of the (i−1)-th sensing pixel row (SP[i−1]) and the i-th sensing pixel row (SP[i]). The voltage at the first node N1 of the sensing pixels included in the (i−1)-th sensing pixel row (SP[i−1]) and the i-th sensing pixel row (SP[i]) increases to a predetermined voltage by the coupling of the reference capacitor (Cref).

In the stage S30, the scan driver 20 applies an enable-level scan signal to the scan line of the (i−1)-th sensing pixel row (SP[i−1]). The second transistor TR2 included in the (i−1)-th sensing pixel row (SP[i−1]) is turned on, and the sensing signal is transmitted to the corresponding sensing lines (R1-Rn). The sensing driver 30 may receive the sensing signal transmitted through the sensing lines (R1-Rn).

Referring to FIG. 6 (b), in the stage S10, the scan driver 20 applies an enable-level initialization signal to the initialization line of the sensing pixel rows, the first sensing pixel row (SP[1]) to the m-th sensing pixel row (SP[m]). That is, the first node N1 of the sensing pixels included in the sensing pixel rows of the first to the m-th rows may be set to have the initialization voltage (VINT).

In the stage S20, the scan driver 20 applies a disable-level initialization signal to the initialization line of the i-th sensing pixel row (SP[i]) and the (i+1)-th sensing pixel row (SP[i+1]). The voltage at the first node N1 of the sensing pixels included in the i-th sensing pixel row (SP[i]) and the (i+1)-th sensing pixel row (SP[i+1]) increases to a predetermined voltage by coupling of the reference capacitor (Cref).

In the stage S30, the scan driver 20 applies an enable-level scan signal to the scan line of the i-th sensing pixel row (SP[i]). The second transistor TR2 included in the i-th sensing pixel row (SP[i]) is turned on, and the sensing signal is transmitted to the corresponding sensing lines (R1-Rn). The sensing driver 30 may receive the sensing signal transmitted through the sensing lines (R1-Rn).

In a like manner, after receiving the sensing signal from the i-th sensing pixel row (SP[i]), as shown in FIG. 6 (c), the fingerprint sensing device repeats the stages S10-S30 so as to receive the sensing signal from the (i+1)-th sensing pixel row (SP[i+1]), which will not be described.

Referring to FIG. 7, before the period of t1-t2, the scan driver 20 applies a disable-level (H) initialization signal to the initialization line of the first sensing pixel row (SP[1]) to the m-th sensing pixel row (SP[m]). During the period of t1-t2, the scan driver 20 applies a disable-level (H) initialization signal (G[i−1:i]) to the initialization line of the (i−1)-th sensing pixel row (SP[i−1]) and the i-th sensing pixel row (SP[i]).

The third transistor TR3 of the sensing pixels included in the (i−1)-th sensing pixel row (SP[i−1]) and the i-th sensing pixel row (SP[i]) is turned off, and the voltage at the first node N1 increases to a predetermined voltage by coupling of the reference capacitor (Cref).

In this instance, when there is a touch to the sensing pixels included in the (i−1)-th sensing pixel row (SP[i−1]) and the i-th sensing pixel row (SP[i]), the voltage may be divided to the touch capacitor Cf coupled in parallel to the reference capacitor (Cref).

Therefore, the voltage at the first node N1 when there is a touch is lower than the voltage at the first node N1 when there is no touch.

A fingerprint of a user includes ridges and valleys. A distance between one electrode of the touch capacitor Cf and a valley when the valley is touched is longer than a distance between one electrode of the touch capacitor Cf and a ridge when the ridge is touched. Therefore, capacitance of the touch capacitor Cf may become less when the valley is touched than that when the ridge is touched.

While applying a disable-level (H) initialization signal (G[i−1:i]) within the period of t1-t2, the scan driver 20 applies an enable-level (L) scan signal (S[i−1]) to the scan line of the (i−1)-th sensing pixel row (SP[i−1]).

The second transistor TR2 of the sensing pixels of the (i−1)-th sensing pixel row (SP[i−1]) is turned on by the enable-level (L) scan signal (S[i−1]). A sensing current may flow through the first transistor TR1 by the voltage at the control end (i.e., the first node N1) of the first transistor TR1 and the power supply voltage (VDD) applied to the first end. The sensing current may gradually have greater values in order when the ridge is touched, when the valley is touched, and when there is no touch. The sensing current may be transmitted as a sensing signal to the respective sensing lines (R1-Rn) through the second transistor TR2.

Conventionally, the touch capacitor Cf included in the sensing pixel row (SP[i−1]) to be detected forms an electric field with the finger, thereby generating a fringe effect. The fringe effect gives an influence to the sensing current value, so the fingerprint image causes a blur effect.

Regarding the driving method according to another exemplary embodiment, a disable-level (H) initialization signal is applied to the sensing pixel row (SP[i−1]) for detecting a sensing signal and the sensing pixel row (SP[i]) provided adjacent to the sensing pixel row (SP[i−1]), so a predetermined level of voltage is applied to the node N1 connected to the one electrode of the touch capacitor Cf. When the touch capacitor Cf included in the sensing pixel row (SP[i−1]) for detecting a sensing signal forms an electric field with the finger, the touch capacitor included in the sensing pixel row (SP[i]) provided adjacent to the sensing pixel row (SP[i−1]) also forms an electric field with the finger. That is, the voltage is applied to one electrode of the touch capacitor Cf of the sensing pixel row (SP[i]) provided in the second direction, so the fringe effect may be attenuated by some degree.

Further, in the period of t1-t2, the scan driver 20 applies an enable-level (L) initialization signal to the initialization line of the sensing pixel rows of the first row to the (i−2)-th row and the (i+1)-th row to the m-th row. The initialization voltage (VINT) is applied to one electrode (the first node N1) of the touch capacitor Cf of the sensing pixels included in the sensing pixel rows of the first row to the (i−2)-th row and the (i+1)-th row to the m-th row.

Therefore, the one electrode of the touch capacitor Cf of the sensing pixel rows is not in a float state but is fixed with a predetermined voltage level, thereby reducing noise generated by the user's body.

For the period of t2-t3, an enable-level (L) initialization signal (G[i:i+1]) is applied to all initialization lines (G1-Gm) to initialize the first node N1 of all sensing pixels (SPs) with the initialization voltage (VINT).

For the period of t3-t4, the scan driver 20 applies a disable-level (H) initialization signal (G[i:i+1]) to the initialization line of the i-th sensing pixel row (SP[i]) to the (i+1)-th sensing pixel row (SP[i+1]). The third transistor TR3 of the sensing pixels included in the i-th sensing pixel row (SP[i]) to the (i+1)-th sensing pixel row (SP[i+1]) is turned off, and the voltage at the first node N1 increases to a predetermined voltage by coupling of the reference capacitor (Cref).

While applying a disable-level (H) initialization signal (G[i:i+1]) within the period of t3-t4, the scan driver 20 applies an enable-level (L) scan signal (Slip to the scan line of the i-th sensing pixel row (SP[i]). The second transistor TR2 of the sensing pixels of the i-th sensing pixel row (SP[i]) is turned on by the enable-level (L) scan signal (Slip. A sensing current may flow through the first transistor TR1 by the voltage at the control end (the first node N1) of the first transistor TR1 and the power supply voltage (VDD) applied to the first end. The sensing current may gradually have greater values in order when the ridge is touched, when the valley is touched, and when there is no touch. The sensing current may be transmitted as a sensing signal to the respective sensing lines (R1-Rn) through the second transistor TR2.

Further, in the period of t3-t4, the scan driver 20 applies an enable-level (L) initialization signal to the initialization line of the sensing pixel rows of the first row to the (i−1)-th row and the (i+2)-th row to the m-th row.

For the period of t4-t5, an enable-level (L) initialization signal is applied to all initialization lines (G1-Gm) to initialize the first node N1 of all sensing pixels (SPs) with the initialization voltage (VINT).

Through the above-described driving method, the fingerprint sensing device according to an exemplary embodiment and the method for driving the fingerprint sensing device may decrease external noise and may reduce the blurring effect of the fingerprint image to thus acquire the accurate fingerprint pattern.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A fingerprint sensing device comprising:
   a fingerprint sensor including a plurality of scan lines and a plurality of initialization lines extending in a first direction and arranged in a second direction, a plurality of sensing lines extending in the second direction and arranged in the first direction, and a plurality of sensing pixels connected to the scan lines, the initialization lines, and the sensing lines and disposed in a matrix configuration;
   a scan driver configured to apply an enable-level initialization signal to a-numbered sensing pixel rows while applying a disable-level initialization signal to b-numbered sensing pixel rows, and applying an enable-level scan signal to one sensing pixel row in the b-numbered sensing pixel rows; and
   a sensing driver configured to receive a sensing signal from the sensing pixel row to which the scan signal is applied through the sensing lines,
   wherein the a and b are positive numbers that are greater than 2 and
   wherein
   the sensing pixels respectively include:
   a reference capacitor including one electrode connected to a first node and another electrode connected to a corresponding initialization line from among the plurality of initialization lines,
   a touch capacitor including one electrode connected to the first node,
   a first transistor configured to output a sensing signal to a corresponding sensing line from among the sensing lines according to a voltage at the first node,
   a second transistor connected to a corresponding scan line from among the scan lines and configured to transmit the sensing signal to the sensing line, and
   a third transistor connected to the initialization line and initializing the first node.

2. The fingerprint sensing device of claim 1, wherein the fingerprint sensor further includes an initialization voltage line configured to transmit an initialization voltage, and a power supply voltage line configured to transmit a power supply voltage with a higher level than that of the initialization voltage.

3. The fingerprint sensing device of claim 2, wherein the first transistor includes a control electrode connected to the first node, a first electrode connected to the power supply voltage line, and a second electrode connected to the second transistor.

4. The fingerprint sensing device of claim 3, wherein the second transistor includes a control electrode connected to the scan line, a first electrode connected to the second electrode of the first transistor, and a second electrode connected to the sensing line.

5. The fingerprint sensing device of claim 4, wherein
the third transistor includes a control electrode connected to the initialization line, a first electrode connected to the initialization voltage line, and a second electrode connected to the first node.

6. The fingerprint sensing device of claim 1, wherein
when the b is an odd number, the scan driver applies the enable-level scan signal to the one sensing pixel row provided in a middle of the b-numbered sensing pixel rows.

7. The fingerprint sensing device of claim 1, wherein
the a-numbered sensing pixel rows include sensing pixel rows provided adjacent to the b-numbered sensing pixel rows.

8. The fingerprint sensing device of claim 7, wherein
the a-numbered sensing pixel rows include sensing pixel rows excluding the b-numbered sensing pixel rows.

9. The fingerprint sensing device of claim 1, wherein
the scan driver applies an enable-level scan signal to the one sensing pixel row, and applies an enable-level initialization signal to the a-numbered sensing pixel rows.

10. A method for driving a fingerprint sensing device including a fingerprint sensor including a plurality of scan lines and a plurality of initialization lines extending in a first direction and arranged in a second direction, a plurality of sensing lines extending in the second direction and arranged in the first direction, and a plurality of sensing pixels connected to the scan lines, the initialization lines, and the sensing lines and disposed in a matrix configuration, comprising:
applying a disable-level initialization signal to b-numbered sensing pixel rows, and applying an enable-level initialization signal to a-numbered sensing pixel rows;
while applying the initialization signal, applying an enable-level scan signal to one sensing pixel row in the b-numbered sensing pixel rows; and
receiving a sensing signal from the sensing pixel row to which the scan signal is applied through the sensing lines,
wherein the a and b are positive numbers that are greater than 2 and
wherein
the sensing pixels respectively include:
a reference capacitor including one electrode connected to a first node and another electrode connected to a corresponding initialization line from among the plurality of initialization lines,
a touch capacitor including one electrode connected to the first node,
a first transistor configured to output a sensing signal to a corresponding sensing line from among the sensing lines according to a voltage at the first node,
a second transistor connected to a corresponding scan line from among the scan lines and configured to transmit the sensing signal to the sensing line, and
a third transistor connected to the initialization line and configured to initialize the first node.

11. The method of claim 10, further comprising,
after receiving the sensing signal, applying an enable-level initialization signal to the a-numbered sensing pixel row.

12. The method of claim 11, wherein
the fingerprint sensor further includes an initialization voltage line configured to transmit an initialization voltage, and a power supply voltage line configured to transmit a power supply voltage with a higher level than that of the initialization voltage.

13. The method of claim 12, wherein
the first transistor includes a control electrode connected to the first node, a first electrode connected to the power supply voltage line, and a second electrode connected to the second transistor.

14. The method of claim 13, wherein
the second transistor includes a control electrode connected to the scan line, a first electrode connected to the second electrode of the first transistor, and a second electrode connected to the sensing line.

15. The method of claim 14, wherein
the third transistor includes a control electrode connected to the initialization line, a first electrode connected to the initialization voltage line, and a second electrode connected to the first node.

16. The method of claim 11, wherein
the a-numbered sensing pixel rows include sensing pixel rows excluding the b-numbered sensing pixel rows.

17. The method of claim 10, wherein
the applying of an enable-level scan signal to one sensing pixel row in the b-numbered sensing pixel rows includes,
when the b is an odd number, applying the enable-level scan signal to one sensing pixel row provided in a middle of the b-numbered sensing pixel rows.

18. The method of claim 10, wherein the a-numbered sensing pixel rows include sensing pixel rows provided adjacent to the b-numbered sensing pixel rows.

* * * * *